Nov. 27, 1962 H. A. BLENKLE 3,065,700
HYDROSTATIC STEERING ARRANGEMENT
Filed April 11, 1961 4 Sheets-Sheet 3
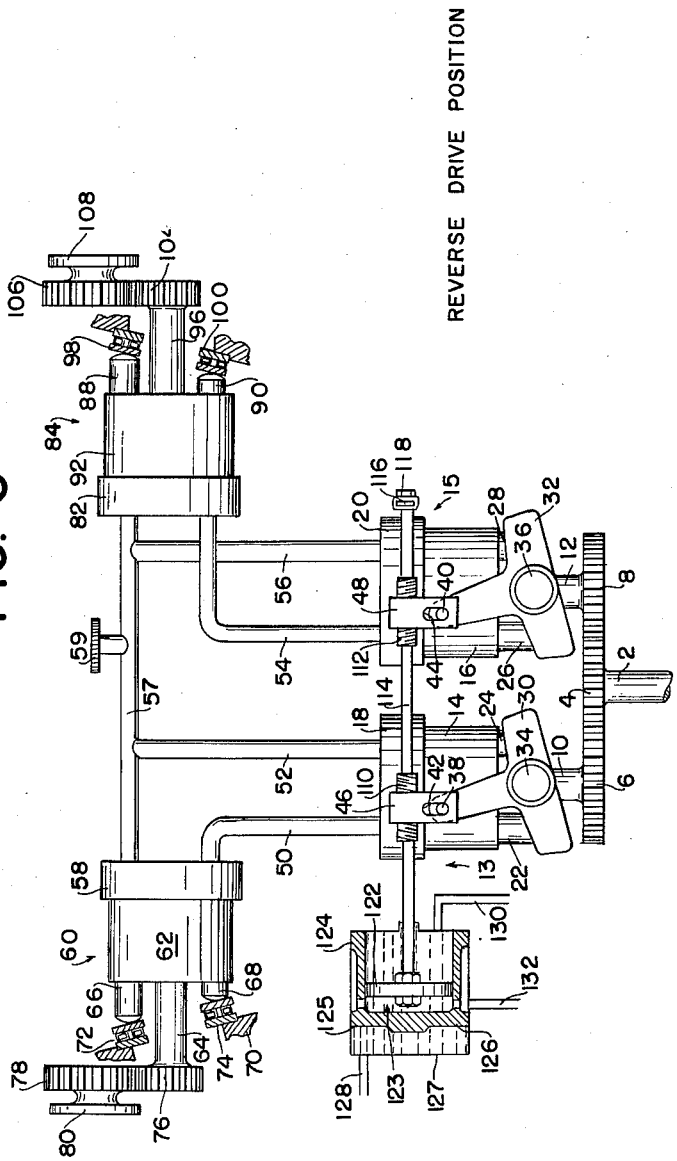
INVENTOR
HERBERT A. BLENKLE
BY *Darby & Darby*
ATTORNEYS Nov. 27, 1962  H. A. BLENKLE  3,065,700
HYDROSTATIC STEERING ARRANGEMENT
Filed April 11, 1961  4 Sheets-Sheet 4
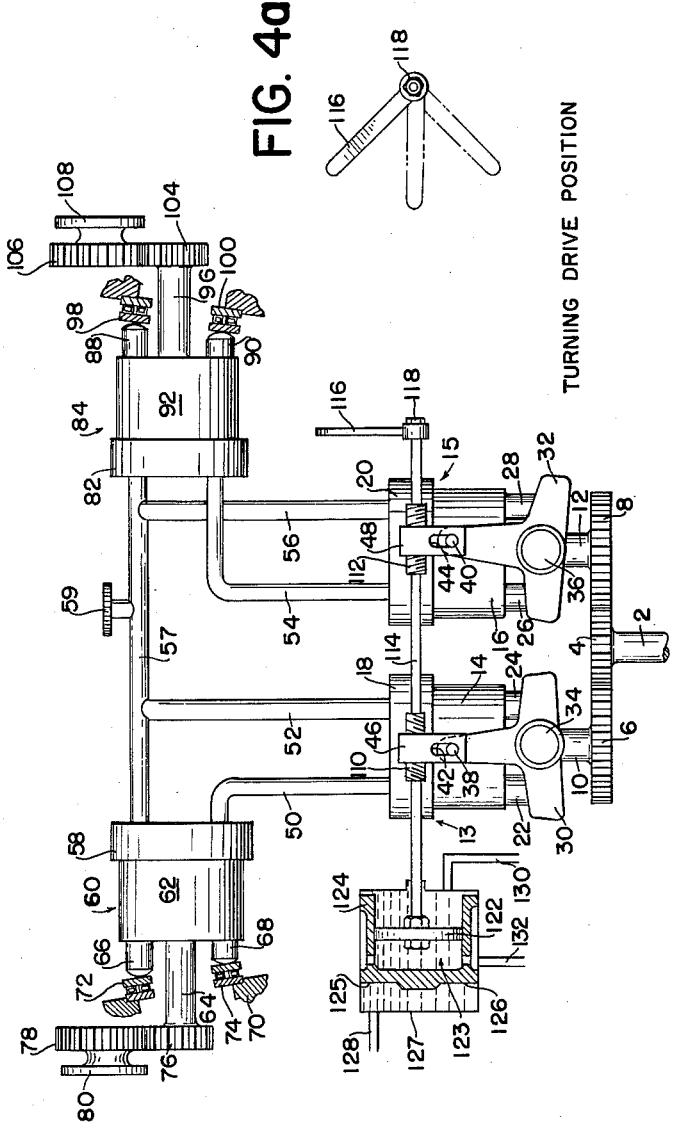
INVENTOR
HERBERT A. BLENKLE
BY  Darby & Darby
ATTORNEYS United States Patent Office 3,065,700
Patented Nov. 27, 1962

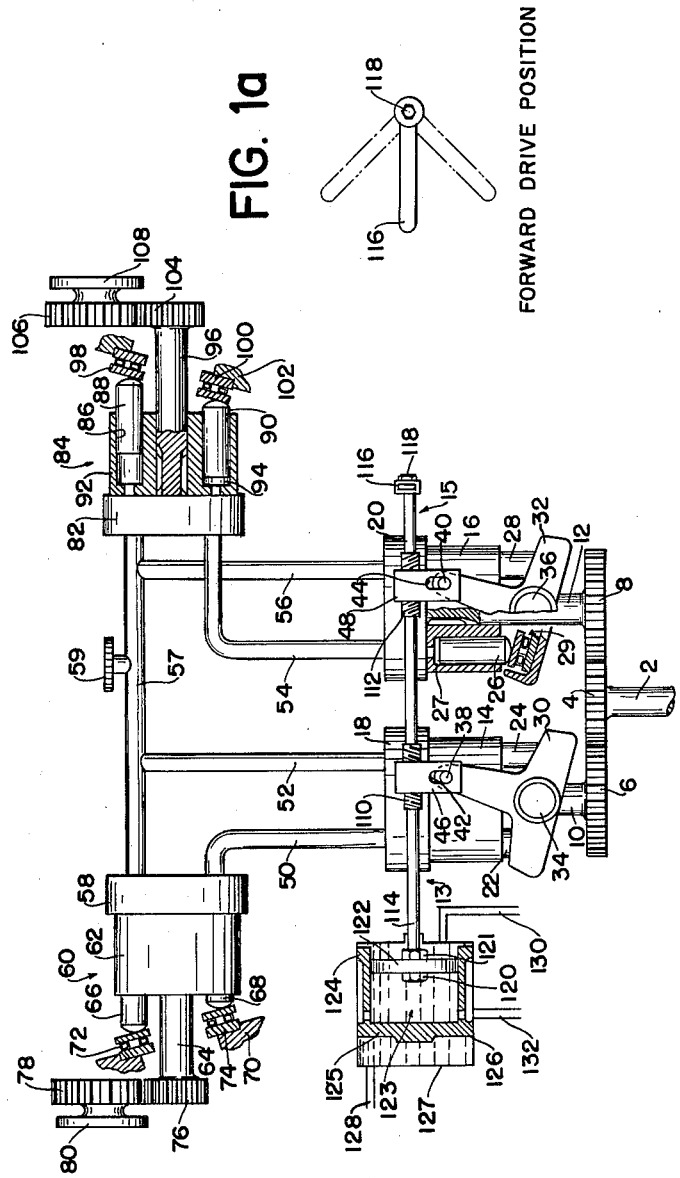

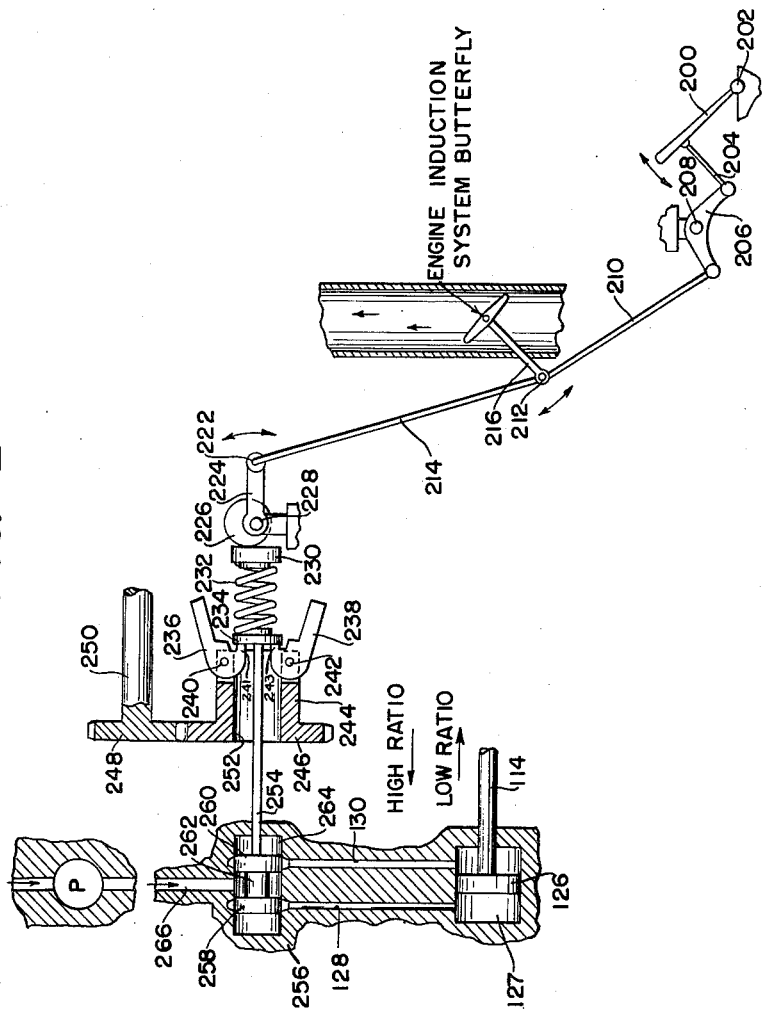

3,065,700
HYDROSTATIC STEERING ARRANGEMENT
Herbert A. Blenkle, Englewood, N.J., assignor to Fairchild Stratos Corporation, a corporation of Maryland
Filed Apr. 11, 1961, Ser. No. 102,195
7 Claims. (Cl. 103—11)

This invention relates to a hydrostatic steering arrangement and more particularly relates to an improved swash plate control system for use in such a steering arrangement.

In the past, the steering of tracked vehicles such as tanks was accomplished by braking one track while applying greater power to the other. This system of steering wasted power inasmuch as power was needed to both brake one track and cause the other track to increase speed. It has therefore long been desired to provide some sort of regenerative steering system, that is, a system in which the braking power is regenerated to the driving track to increase the overall effective propulsion power. It has been found that a vehicle having a hydrostatic pump and motor transmission system is ideally suitable for the provision of such a regenerative steering system. In the present systems, however, the assembly necessary to control such a regenerative steering system is often very complex, leading to the possibility of numerous mechanical breakdowns, as well as contributing to a high initial cost.

According to the present invention, it has now been found that by using a single actuator shaft to control the pumps which drive the motors on either side of the vehicle, a simple and robust steering mechanism can be provided.

It is therefore a primary object of this invention to provide an improved regenerative steering system for tracked vehicles.

It is also an object of this invention to provide a hydrostatic transmission for tracked vehicles in which the steering and ratio change can be controlled by a single actuator shaft.

It is a further object of this invention to provide an assembly for controlling two hydrostatic pumps by a single actuating shaft.

It is still a further object of this invention to move the swash plates of a plurality of hydraulic motors or pumps in different directions by means of a single control.

These and further objects and advantages of the invention will become more apparent upon reference to the following specification and claims and appended drawings wherein:

FIGURE 1 is a schematic plan view, partly in section, showing the regenerative steering apparatus of the present invention in a forward drive position;

FIGURE 1A shows a side view of the steering lever of FIGURE 1;

FIGURE 2 shows a schematic plan view, partly in section, of the speed control system of the present invention;

FIGURE 3 shows a schematic plan view, corresponding to FIGURE 1, of the steering apparatus of the present invention in a reverse drive position;

FIGURE 4 shows a schematic plan view, corresponding to FIGURE 1, of the steering apparaus of the present invention in a turning drive position; and FIGURE 4A shows a side view of the steering lever shown in FIGURE 4.

Referring now to FIGURE 1, an input shaft 2 carries a gear 4 which meshes with identical gears 6 and 8. Gears 6 and 8 are mounted on shafts 10 and 12 which serve to rotatably drive barrels 14 and 16, respectively, of a pair of hydrostatic pumps, 13 and 15. The barrels 14 and 16 are mounted for rotation in control discs 18 and 20 of these pumps. The barrel 14 of the pump 13 is provided with a plurality of pistons, a pair of which 22 and 24 are shown, which reciprocate in suitable cylinders. In like manner, a plurality of pistons 26 and 28 reciprocate in cylinders in the barrel 16 of the right hand pump as shown at 27. The pump 13 is provided with a tiltable swash plate 30 and pump 15 is provided with a similar swash plate 32.

As shown in the pump 15, the swash plates are provided with a bearing surface 29 with which the pistons cooperate to impart a pumping action to the fluid contained in the cylinders. The swash plates are mounted for pivotal movement on pins 34 and 36 which are mounted in a suitable fashion on the pump housing. The swash plates are also provided with pins 38 and 40 which are carried in slots 42 and 44 cut out of plates or follower nuts 46 and 48. The function of these plates will be explained more fully below. Although these pumps are shown with only two pistons, any desired number may be provided.

The pumps 13 and 15 communicate with constant displacement hydrostatic motors 60 and 84 by means of conduits such as those shown at 50, 52, 54 and 56. The motors are similar in construction to the pumps. The motor 60 has a control disc 58 and a barrel 62 mounted for rotational movement in the control disc. The barrel is provided with a plurality of cylinders in which reciprocate pistons such as shown at 66 and 68. These pistons cooperate with a stationary swash plate having bearing surfaces 72 and 74 which are fixedly mounted on any suitable support 70 to cause the barrel 62 and thus the shaft 64 on which the barrel is mounted to rotate. The shaft 64 carries a gear 76. Meshing with the gear 76 is a gear 78 which carries an output flange 80 which may be fastened in any suitable manner to the driving mechanism or track of the vehicle.

The motor 84 is similar to the motor 60. The motor 84 is provided with a control disc 82 and a barrel 92 rotatably movable therein. The barrel is provided with a plurality of pistons such as shown at 88 and 90 which reciprocate in cylinders 86 and 94. The outer ends of the pistons react with a stationary swash plate having bearing surfaces 98 and 100 mounted on a suitable support 102 to cause the barrel 92 to rotate. The barrel is mounted on a shaft 96 which carries at its other end a gear 104 similar to the gear 76. Meshing with the gear 104 is another gear 106 which carries an output flange 108 similar to the output flange 80 associated with the left hand motor 60.

The motors 60 and 84 are connected by a conduit 57 in which is located a needle valve 59. This arrangement provides for an adjustable high pressure bleed between the motors which correspond in action to that of a differential and permits one track to cover a greater distance than the other. The needle valve bleed is desirable in rough terrain where one track of the vehicle is running on a smooth surface and the other track is running on an undulating surface. If the track running on the undulating surface follows the contour of the ground it may need to run faster than the other track to prevent a gradual turning toward the rough surface. By use of the manually operated needle valve 59, the driver of the vehicle can compensate for any tendency to turn toward the rougher surface without using the steering apparatus.

The operation of the apparatus described above will now be discussed. Any conventional source of power can be used to rotate the input shaft 2 such as the driving motor of a tank, truck or other tracked vehicle. As this shaft rotates, the gear 4 causes the gears 6 and 8 to rotate. The rotation of these gears together with the shafts on which they are mounted causes the rotation of the barrels 14 and 16. As these barrels rotate, the pistons 22, 24, 26 and 28 are caused to reciprocate by their coming into contact with bearing surfaces located in the swash plates such as shown at 29. The reciprocation of these pistons causes them to displace the fluid contained in the respective cylinders and force it through one of the conduits 50, 52, 54 and 56 to the associated motor. The fluid thus displaced causes the pistons in the associated motor to be displaced by the fluid, causing the barrel of the motor to rotate in a well known manner.

As is well know, the torque transmitted by apparatus such as that shown is dependent upon the angle of the swash plates. Assuming that each pump and motor have equal full angle displacement, at full pump displacement, the pump drives the motor at the same speed as the pump, this coupling corresponding to a transmission ratio of 1:1. The speed is thus greatest when the swash plate angle of tilt is greatest due to the longer piston stroke that this angle permits. As the angle of tilt decreases towards the null position, the piston stroke gets shorter and thus more strokes are necessary to displace sufficient fluid to turn the motor.

For example, when the swash plate is at the 1/10 displacement position, the pumps make ten revolutions to displace sufficient working fluid to drive the motor one revolution. This would correspond to a transmission ratio of 10:1. When the swash plate is in a null position, no power is developed as there is no piston stroke at all and the device is locked. As the swash plate is tilted away from the null position in the negative direction, the pump and motor reverse, which of course results in the driving of the output flanges in the reverse direction. FIGURE 3 shows the swash plates rotated in this direction so that both of the motors have reversed their direction of rotation.

The operation and function of the plates 46 and 48 will now be explained. As can be seen in FIGURE 1, these plates are provided with bores having internal threading which cooperate with spiral threads 110 and 112 formed on an actuator shaft 114. The threads 110 and 112 are oppositely grooved. As shown, the thread 110 is a left hand thread and 112 is a right hand thread but these could be reversed if desired. The actuator shaft 114 has mounted on one end a steering lever 116 held in place by a suitable nut 118.

The other end of the actuator shaft 114 is fastened by means of nuts 120 and 121 to a piston 122. The piston 122 reciprocates in a cylinder 123 defined by the angular side walls 124 and the head 125 of a second piston 126. The piston 126 is adapted for reciprocal movement in a cylinder 127. Three fluid connections are provided to the cylinder; the connector 128 leading to the chamber formed by the head 125 of the piston 126 and the walls of the cylinder 127, the connection 130 leading to the chamber formed by the piston 122 and the walls of the cylinder 127, and the connection 132 being in fluid communication with the cylinder 123 formed between the piston 122 and the piston 126. The double piston 122, 126 is of the type described and claimed in copending application #455,437, of H. Ebert, filed September 13, 1954, now Patent No. 2,905,150, issued September 22, 1959, that allows different speed ranges for forward and reverse operation.

The operation of the apparatus just discussed will now be described. When it is desired to steer the vehicle in one direction or another, it is necessary to slow down the speed of rotation of one of the output flanges 80 or 108 and increase the speed of the other. Suppose, for example, it is desired to turn the vehicle to the left, thus requiring that the output flange 80 be slowed down and the output flange 108 be speeded up. The driver of the vehicle begins to rotate the steering lever 116 in a clockwise direction. As the steering lever 116 is rotated in a clockwise direction, the actuator shaft 114 is being similarly rotated. The rotation of the shaft 114 causes the threads 110 and 112 to rotate in the follower nuts or plates 46 and 48. Since the threads are grooved in opposite directions, the interaction of the thread 110 and the nut 46 causes the nut 46 to move to the left while the interaction of the thread 112 and nut 48 causes the nut 48 to move to the right.

As the nut 46 moves to the left, the slot 42 acts on the pin 38 which is mounted on the swash plate 30. This movement to the left by nut 46 causes the swash plate to rotate counterclockwise on its pivot 34, thus decreasing its angle of tilt and correspondingly decreasing the piston stroke of the pistons 22 and 24. This decrease in piston stroke causes a decrease in speed of the motor 60 and thus a decrease in speed of the output flange 80.

At the same time as the angle of stroke of the swash plate 30 is being decreased, the angle of tilt of the swash plate 32 is being increased. As the nut 48 moves to the right, the slot 44 acting on the pin 40 causes the swash plate 32 to rotate clockwise on its pivot 36, thus increasing its angle of tilt and correspondingly increasing the piston stroke and therefore the speed of the motor 84. To cause the vehicle to turn in the opposite direction, it is obvious that it is only necessary to turn the steering lever 116 in a counterclockwise direction.

As the steering lever is rotated and the vehicle begins to turn, the regenerative action of the present transmission takes effect. Instead of the motor 84 being braked as the vehicle turns to the right, with a consequent loss of power, this motor begins to act as a pump and the pump 15 begins to act as a motor, thus enabling more of the power developed by the shaft 2 to drive the pump 13. This operation takes place as follows: As the steering lever is rotated, the angle of the swash plate 32 becomes less positive, thus reducing the displacement of the pump 15. Since the displacement of the motor 84 remains constant, its displacement will become larger than that of the pump 15, causing the motor 84 to act as a pump and the pump 15 to act as a motor which drives the gear 8, thus providing more power for driving the gear 6. As the speed of rotation of the pump motor 84 decreases, a displacement balance will be reached and the pump 15 and motor 84 will resume their normal functions. The vehicle will then continue to turn, as one output flange is rotating at a higher speed than the other.

In a situation where an extremely tight turn is desired, it may be necessary for one track to go in reverse while the other is going in a forward direction. Such a situation is shown in FIGURE 4, where the left hand pump 13 has its swash plate 30 tilted negatively so that the pump 13 has reversed its previous direction of flow, causing a corresponding reversal of rotational direction in the motor 60 and its output flange 80. The pump 15 still has its swash plate 32 tilted positively so that the pump 15 rotates in the forward direction with a corresponding forward rotation being present in the motor 84 and its output flange 108.

It is obvious from the above discussion that the speed of the vehicle is dependent on the longitudinal position of the actuator rod. FIGURE 2 shows an apparatus for controlling the position of the rod 114. In this figure, a throttle plate 200 is mounted for rotation in any suitable manner, for example, on a pin 202. The throttle plate 200 carries a shaft 204 which is suitably connected to one end of a bell crank 206. The bell crank 206 is rotatably mounted on pivot pin 208 and has attached to its other end a lever 210. The shaft 210 is connected by a pin 212 to a shaft 216 which controls an engine induction system butterfly.

The pin 212 also connects the lever 210 to a lever 214. The other end of the lever 214 is connected by means of a suitable pin 222 to one end of an arm 224. The arm 224 controls the position of a cam 226 by means of a pin 228. The cam 226 abuts against a plate 230 which is urged against the cam by the action of a spring 232. The spring 232 is attached at one end of one side of the plate 230 and at the other end to a second plate 234.

A pair of counter weights 236 and 238 mounted on pins 240 and 242 respectively are generally J-shaped and have their short legs 241 and 243 abutting against the plate 234. The counter weights are positioned by the pins 240 and 242 in slots cut out of the annular wall 244 of a governor 252. The annular wall 244 forms a cylinder and is integral with the front plate 246 of the governor. The front plate 246 of the governor 252 is provided with gear teeth which mesh with a gear 248 mounted on a transmission input shaft takeoff 250.

A shaft 254 is axially centered in the cylinder formed by the annular wall 244 and has one end permanently fastened in any suitable manner to the inside face of the plate 234. The shaft 254 is fastened at its other end to a spool valve 256. The spool valve 256 has two raised portions 258 and 260 with a narrow portion 262 therebetween. The spool valve reciprocates in a cylinder 264 under the action of the shaft 254. A fluid inlet 266 connected to an external make-up pump provides a source of pressure for the cylinder 264.

The cylinder 264 has a pair of outlets which are connected to the connectors 128 and 130 which control the action of the piston 126 in the cylinder 127. This piston 126 is normally of the same type shown in FIGURE 1 but is shown here in a more simplified form. It is to be understood that it actually comprises the double piston arrangement shown in FIGURE 1 and actuates the actuator shaft 114 which controls the swash plates shown in FIGURE 1.

In the operation of this apparatus the spring 232 is set to exert a constant biasing spring preload on the plate 234 which corresponds to a definite speed setting. The shaft 250 and its driven gear 248 are rotating at a speed corresponding to the vehicle motor shaft speed. The rotation of the gear 248 causes rotation of the governor 252, which rotation exerts a centrifugal force on the counterweights 236 and 238 causing their legs 241 and 243 to exert a balancing force on the plate 234.

If the vehicle motor shaft speed falls below the set speed of spring 232 the balancing spring force overcomes the counterweight centrifugal action and moves the plates 234 to the left. This movement is transmitted through the shaft 254 to the spool valve 256. As the spool valve is moved to the left, fluid pressure is introduced into the left hand chamber of the cylinder 127 by the connection 128. The increased pressure on the left side of the piston 126 causes it to move to the right together with its actuator shaft 114.

The movement of actuator shaft 114 causes the swash plates to tilt at a lesser angle from the null position, thus decreasing their transmission ratio. As the transmission shifts to the lower ratio, the engine speed increases. This increases the rotational speed of the governor and thus, the centrifugal forces on the counterweights 236 and 238, until the speed is attained at which the centrifugal reaction force slightly exceeds the biasing spring force. The action of the counterweights 236 and 238 on the plate 234 causes the spool valve to be moved back into its neutral position, closing off the flow into the cylinder 127 and maintaining the pistons at a fixed position.

In a similar manner, when the engine overspeeds, the counterweight reaction force exceeds the biasing spring force and the spool moves to the right, allowing fluid to enter the right hand chamber of the cylinder 127. This increase in pressure in the right hand side causes the piston 126 to move to the left thus causing the actuator shaft 114 to increase the angle of tilt of the swash plates and thus increase the transmission ratio. This increases the engine load, reducing the engine speed until the spool valve is again moved to the neutral position.

The balancing spring force is adjusted by the cam 226 which is under the control of the throttle 200. As the throttle is opened, the balancing spring force is increased and the transmission adjusts the ratio to maintain a higher engine speed. The reverse is true when the throttle is closed.

It will be apparent from the foregoing that the present invention provides a novel apparatus for steering a tracked vehicle utilizing a regenerative hydrostatic transmission. The present invention provides a simple, mechanically robust system for positioning the swash plates of a plurality of hydrostatic pumps by rotational movement of a single actuator shaft.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a hydrostatic regenerative steering transmission the combination comprising a first hydrostatic pump, a second hydrostatic pump, a first swash plate operatively associated with said first pump, a second swach plate operatively associated with said second pump, an actuator shaft, said actuator shaft having two spirally threaded sections intermediate the ends thereof, said sections being threaded in opposite directions, said first swash plate being operatively connected with one of said sections, said second swash plate being operatively connected with the other of said threaded sections whereby the rotary motion of said actuator shaft causes said first swash plate and said second swash plate to move in opposite directions relative to said shaft.

2. In a hydrostatic regenerative steering transmission the combination comprising, a first hydrostatic pump, a second hydrostatic pump, a first swash plate operatively associated with said first pump, a second swash plate operatively associated with said second pump, an actuator shaft, said shaft having two threaded sections, one of said sections having a right hand thread and the other of said sections having a left hand thread, a follower nut operatively mounted on each of said threaded sections, said follower nuts being connected with said swash plates to determine the rotational movement thereof.

3. In a hydrostatic regenerative steering transmission, the combination comprising a first hydrostatic pump, a first swash plate operatively associated with said first pump so that the angle of tilt of said first swash plate determines the output of said first pump, a second hydrostatic pump, a second swash plate operatively associated with said second pump so that the angle of tilt of said second swash plate determines the output of said second pump, an actuator shaft, said actuator shaft having a first threaded portion and a second threaded portion intermediate the ends thereof, said first threaded portion having a left hand thread, said second threaded portion having a right hand thread, a first follower nut mounted on and cooperating with said first threaded portion, a second follower nut mounted on and cooperating with said second threaded portion, said first follower nut being operatively connected to said first swash plate so that movement of said follower nut along said actuator shaft changes the angle of tilt of said first swash plate in a first direction, said second follower nut being operatively connected to said second swash plate so that movement of said second follower nut along said actuator shaft changes the angle of tilt of said second swash plate in a direction opposite said first direction, said first and said second swash plates thereby varying the outputs of said first and second pumps in opposite senses upon rotational movement of said actuator shaft.

4. In a hydrostatic regenerative steering transmission having a pair of hydrostatic pumps, an actuator shaft, said actuator shaft having a pair of threaded sections intermediate the ends thereof, a follower nut cooperating with each of said threaded sections, said follower nuts controlling the angle of tilt of a pair of swash plates operatively associated with said pair of pumps.

5. The apparatus of claim 4 wherein said threaded sections are oppositely grooved.

6. Thes apparatus of claim 5 wherein rotational movement of said actuator shaft causes the angle of tilt of said swash plates to vary in different directions.

7. In a hydrostatic regenerative steering transmission, the combination of an actuator shaft, said actuator shaft having a first threaded section and a second threaded section located intermediate the ends thereof, a first follower nut cooperating with said first threaded section and having a slot therein, a first swash plate mounted for rotation about a pivot, a first pin carried by said first swash plate and cooperating with said slot in said first follower nut, a second follower nut cooperating with said second threaded section and having a slot therein, a second swash plate mounted for rotation around a pivot, and a second pin carried by said second swash plate and cooperating with said slot in said second follower nut.

References Cited in the file of this patent

UNITED STATES PATENTS

| | | |
|---|---|---|
| 2,446,242 | Orshansky | Aug. 3, 1948 |
| 2,513,446 | Brown | June 4, 1950 |
| 2,599,450 | Henning | June 3, 1952 |
| 2,804,016 | Moore | Aug. 27, 1957 |
| 2,941,609 | Bowers et al. | June 21, 1960 |